US009411898B1

(12) United States Patent
Ward

(10) Patent No.: US 9,411,898 B1
(45) Date of Patent: *Aug. 9, 2016

(54) PROCESSING AND STORAGE OF SPATIAL DATA

(71) Applicant: Moonshadow Mobile, Inc., Eugene, OR (US)

(72) Inventor: Roy W. Ward, Eugene, OR (US)

(73) Assignee: MOONSHADOW MOBILE, INC., Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/489,430

(22) Filed: Sep. 17, 2014

Related U.S. Application Data

(63) Continuation of application No. 13/740,278, filed on Jan. 14, 2013, now Pat. No. 8,990,204.

(60) Provisional application No. 61/587,650, filed on Jan. 17, 2012.

(51) Int. Cl.
G06F 7/00 (2006.01)
G06F 17/30 (2006.01)

(52) U.S. Cl.
CPC ...... *G06F 17/3087* (2013.01); *G06F 17/30312* (2013.01)

(58) Field of Classification Search
CPC ..... G06F 17/30321; G06F 7/00; G06F 17/30; G06F 17/30241; G06F 17/248; G06F 17/30589; G06F 17/30327; G06F 17/30867; G06F 17/30598; Y10S 7/99933
See application file for complete search history.

(56) References Cited

U.S. PATENT DOCUMENTS

| | | | |
|---|---|---|---|
| 5,276,868 | A | 1/1994 | Poole |
| 5,710,915 | A | 1/1998 | McElhiney |
| 5,721,899 | A | 2/1998 | Namba |
| 5,737,732 | A | 4/1998 | Gibson et al. |
| 5,829,004 | A | 10/1998 | Au |
| 5,978,797 | A | 11/1999 | Yianilos |
| 6,012,057 | A | 1/2000 | Mayer et al. |
| 6,175,835 | B1 | 1/2001 | Shadmon |
| 6,341,280 | B1 | 1/2002 | Glass et al. |
| 6,374,251 | B1 | 4/2002 | Fayyad et al. |
| 6,499,033 | B1 | 12/2002 | Vagnozzi |
| 6,560,610 | B1 | 5/2003 | Eatherton et al. |

(Continued)

OTHER PUBLICATIONS

U.S. Appl. No. 14/678,982, filed Apr. 4, 2015, Ward.

(Continued)

*Primary Examiner* — Azam Cheema
(74) *Attorney, Agent, or Firm* — David S. Alavi

(57) ABSTRACT

Generating and storing, for a multitude of polygonal areas, spatial coordinates of a multitude of piecewise-linear spatial boundary segments. The polygonal boundary of each area comprises boundary segments; each boundary segment forms a portion of the polygonal boundary of at most two adjacent spatial areas. Can further include one or both of (i) an indicator, for each spatial boundary segment, of the at most two corresponding adjacent spatial areas that are separated by that boundary segment or (ii) an indicator, for each spatial area, of one or more boundary segments that together form the entire polygonal boundary of that spatial area. The electronic indicia of the second dataset can be used, inter alia, (i) to determine in which of a multitude of at least partly contiguous spatial areas is located a given spatial point, or (ii) to graphically render the polygonal borders of the areas.

23 Claims, 4 Drawing Sheets

(56) References Cited

U.S. PATENT DOCUMENTS

| | | | |
|---|---|---|---|
| 6,581,058 B1 | 6/2003 | Fayyad et al. | |
| 6,675,171 B2 | 1/2004 | Tikkanen et al. | |
| 6,721,723 B1 | 4/2004 | Gibson et al. | |
| 6,728,732 B1 | 4/2004 | Eatherton et al. | |
| 7,827,218 B1 | 11/2010 | Mittal | |
| 8,977,656 B2 | 3/2015 | Ward | |
| 8,990,204 B1 | 3/2015 | Ward | |
| 9,002,859 B1 | 4/2015 | Ward | |
| 2001/0042186 A1 | 11/2001 | Iivonen et al. | |
| 2002/0035660 A1 | 3/2002 | Tikkanen et al. | |
| 2002/0087510 A1 | 7/2002 | Weinberg et al. | |
| 2002/0145797 A1* | 10/2002 | Sales | G02B 3/0043 359/456 |
| 2002/0174124 A1* | 11/2002 | Haas | G06F 17/30241 |
| 2003/0018620 A1 | 1/2003 | Vishnubhotla | |
| 2003/0061189 A1 | 3/2003 | Baskins et al. | |
| 2003/0061227 A1 | 3/2003 | Baskins et al. | |
| 2003/0105745 A1 | 6/2003 | Davidson et al. | |
| 2003/0163258 A1* | 8/2003 | Haugland | G01V 3/30 702/6 |
| 2004/0059725 A1 | 3/2004 | Sharangpani et al. | |
| 2004/0107184 A1 | 6/2004 | Longshaw | |
| 2004/0111439 A1 | 6/2004 | Richardson et al. | |
| 2004/0117396 A1 | 6/2004 | Avadhanam et al. | |
| 2004/0133590 A1 | 7/2004 | Henderson et al. | |
| 2004/0193619 A1 | 9/2004 | Venkatachary et al. | |
| 2004/0205517 A1 | 10/2004 | Lampert et al. | |
| 2004/0243576 A1 | 12/2004 | Shrivastava et al. | |
| 2004/0267710 A1 | 12/2004 | Cotarmanach'h et al. | |
| 2005/0027744 A1 | 2/2005 | Avadhanam et al. | |
| 2005/0055351 A1 | 3/2005 | Barton et al. | |
| 2005/0091223 A1 | 4/2005 | Shaw et al. | |
| 2005/0171959 A1 | 8/2005 | Deforche et al. | |
| 2005/0240604 A1 | 10/2005 | Corl et al. | |
| 2005/0251331 A1 | 11/2005 | Kreft | |
| 2006/0271540 A1 | 11/2006 | Williams | |
| 2006/0282457 A1 | 12/2006 | Williams | |
| 2006/0288024 A1 | 12/2006 | Braica | |
| 2007/0192548 A1 | 8/2007 | Williams | |
| 2007/0255748 A1 | 11/2007 | Ferragina et al. | |
| 2008/0019317 A1* | 1/2008 | Vellanki | H04M 1/72572 370/331 |
| 2008/0086464 A1 | 4/2008 | Enga | |
| 2009/0077113 A1 | 3/2009 | Fidaali et al. | |
| 2009/0138790 A1 | 5/2009 | Larcheveque et al. | |
| 2010/0011125 A1 | 1/2010 | Yang et al. | |
| 2010/0023515 A1 | 1/2010 | Marx | |
| 2010/0057792 A1 | 3/2010 | Ylonen | |
| 2010/0085223 A1 | 4/2010 | Hendrickson | |
| 2010/0127902 A1 | 5/2010 | Schneider | |
| 2010/0146004 A1 | 6/2010 | Sim-Tang | |
| 2010/0185609 A1 | 7/2010 | Wright et al. | |
| 2010/0281082 A1 | 11/2010 | Ylonen | |
| 2010/0332561 A1 | 12/2010 | Prahlad et al. | |
| 2011/0016153 A1 | 1/2011 | Atta et al. | |
| 2012/0005239 A1 | 1/2012 | Nevin | |
| 2012/0016908 A1 | 1/2012 | Leung et al. | |

OTHER PUBLICATIONS

U.S. Appl. No. 13/733,890, filed Jan. 4, 2013, Ward.
U.S. Appl. No. 13/743,613, filed Jan. 17, 2013, Ward.
U.S. Appl. No. 14/607,038, filed Jan. 27, 2015, Ward et al.
U.S. Appl. No. 14/489,430, filed Sep. 17, 2014, Ward.
International Search Report and Written Opinion dated Aug. 27, 2012 in co-owned App No. PCT/US2012/020841 (cited in parent).
Gabow, Harold N. Data structures for weighted matching and nearest common ancestors with linking. U. of Colorado, Boulder, Dept of Computer Science, 1990.
Acharya et al; Adaptive Algorithms for Cache-efficient Trie Search; ALENEX'99, LNCS 1619, pp. 296-311, Goodrich & McGeoch (Eds); Sringer-Verlag (1999). (cited in parent).
Bagwell, Fast and Space Efficient Trie Searches, 2000.
Office action dated Sep. 12, 2014 in co-owned U.S. Appl. No. 13/743,613.

* cited by examiner

| polygonal boundary | vertex coordinates | | | | | | |
|---|---|---|---|---|---|---|---|
| A | $XA_1$ | $YA_1$ | ... | ... | $XA_i$ | $YA_i$ | ... |
| B | $XB_1$ | $YB_1$ | ... | ... | $XB_i$ | $YB_i$ | ... |
| C | $XC_1$ | $YC_1$ | ... | ... | $XC_i$ | $YC_i$ | ... |
| ... | | | | | | | |

FIG. 2A

| boundary segment | vertex coordinates | | | | | | |
|---|---|---|---|---|---|---|---|
| 1 | $X1_1$ | $Y1_1$ | ... | ... | $X1_i$ | $Y1_i$ | ... |
| 2 | $X2_1$ | $Y2_1$ | ... | ... | $X2_i$ | $Y2_i$ | ... |
| 3 | $X3_1$ | $Y3_1$ | ... | ... | $X3_i$ | $Y3_i$ | ... |
| ... | | | | | | | |

| boundary segment | polygonal areas | |
|---|---|---|
| 1 | C | null |
| 2 | B | C |
| 3 | C | D |
| ... | | |
| 36 | M | S |
| 37 | M | N |
| 38 | F | N |
| ... | | |

FIG. 3B

| polygonal area | boundary segments | | | | | | | | |
|---|---|---|---|---|---|---|---|---|---|
| A | 4 | 7 | 9 | 8 | | | | | |
| B | 2 | 5 | 12 | 6 | 7 | | | | |
| C | 1 | 3 | 2 | 4 | | | | | |
| ... | | | | | | | | | |
| P | 24 | 27 | 25 | | | | | | |
| Q | 31 | 32 | 33 | 48 | 49 | | | | |
| R | 47 | 53 | 51 | 48 | | | | | |
| ... | | | | | | | | | |

PROCESSING AND STORAGE OF SPATIAL DATA

BENEFIT CLAIMS TO RELATED APPLICATIONS

This application is a continuation of U.S. non-provisional application Ser. No. 13/740,278 filed Jan. 14, 2013 in the name of Roy W. Ward, which in turn claims benefit of U.S. provisional App. No. 61/587,650 filed Jan. 17, 2012 in the name of Roy W. Ward. Both of said applications are hereby incorporated by reference as if fully set forth herein.

BACKGROUND

The field of the present invention relates to processing and storage of spatial data. In particular, systems and methods are described herein for processing and storing data representative of a multitude of at least partly contiguous spatial areas.

SUMMARY

A computer-implemented method comprises: reading or receiving electronic indicia of a first dataset, and generating and storing electronic indicia of a second dataset. The electronic indicia of the first data set are read or received from a computer-readable storage medium operatively coupled to one or more computer processors. The first dataset comprises, for each one of a multitude of at least partly contiguous spatial areas, a corresponding set of spatial coordinates of a closed, polygonal boundary of that spatial area. The one or more processors are used to generate the electronic indicia of the second dataset. The second dataset comprises, for each one of a multitude of piecewise-linear spatial boundary segments, a corresponding set of spatial coordinates of that spatial boundary segment. The electronic indicia of the second dataset are stored on a computer-readable storage medium operatively coupled to the processor (the same medium from which the first dataset was read or received, or a different medium). The polygonal boundary of each spatial area comprises one or more corresponding boundary segments, and each boundary segment forms a portion of the closed, polygonal boundary of at most two adjacent spatial areas and separates those spatial areas. The second dataset can further include one or both of (i) an indicator, for each spatial boundary segment, of the at most two corresponding adjacent spatial areas that are separated by that boundary segment or (ii) an indicator, for each spatial area, of one or more boundary segments that together form the entire polygonal boundary of that spatial area. The electronic indicia of the second dataset can be used, inter alia, (i) to determine in which of a multitude of at least partly contiguous spatial areas is located a given spatial point, or (ii) to graphically render the polygonal borders of the multitude of spatial areas.

Objects and advantages pertaining to processing and storage of spatial data may become apparent upon referring to the exemplary embodiments illustrated in the drawings and disclosed in the following written description or appended claims. This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 2A and 2B are tables of spatial coordinates of multiple polygonal boundaries and multiple boundary segments, respectively.

FIG. 3A is a table relating each boundary segment to the at most two corresponding adjacent spatial areas that are separated by that boundary segment. FIG. 3B is a table relating each spatial area to the boundary segments that form its polygonal boundary.

It should be noted that the embodiments depicted in this disclosure are shown only schematically, and that not all features may be shown in full detail or in proper proportion. Certain features or structures may be exaggerated relative to others for clarity. It should be noted further that the embodiments shown are exemplary only, and should not be construed as limiting the scope of the written description or appended claims.

DETAILED DESCRIPTION OF EMBODIMENTS

For any number of reasons it may be desirable to process data that includes spatial coordinates, e.g., voter registration data or census data. Such processing can often include searching, sorting, or filtering the data based on location, or displaying the data (or a portion thereof) on a globe, map, chart, or other spatial representation. It is often the case that such location-based searching, sorting, or filtering is based on or facilitated by subdividing an aggregate area for which data is available into a multitude of at least partly contiguous spatial areas. The spatial areas of the multitude typically, but not necessarily, are non-over-lapping. Advantageous systems and methods are disclosed herein for processing and storing spatial data representative of those spatial areas.

For convenience of description in the present specification and claims, stored electronic indicia and the underlying data they represent may be referred to interchangeably. It should be noted that the data themselves are an abstraction, and that the representative indicia are the objects that are electronically stored, handled, arranged in a data structure, searched, retrieved, or otherwise processed in the methods and systems disclosed or claimed herein. Use of the term "data" in the present disclosure shall be understood to indicate the representative indicia if appropriate in a given context.

Figure 1:
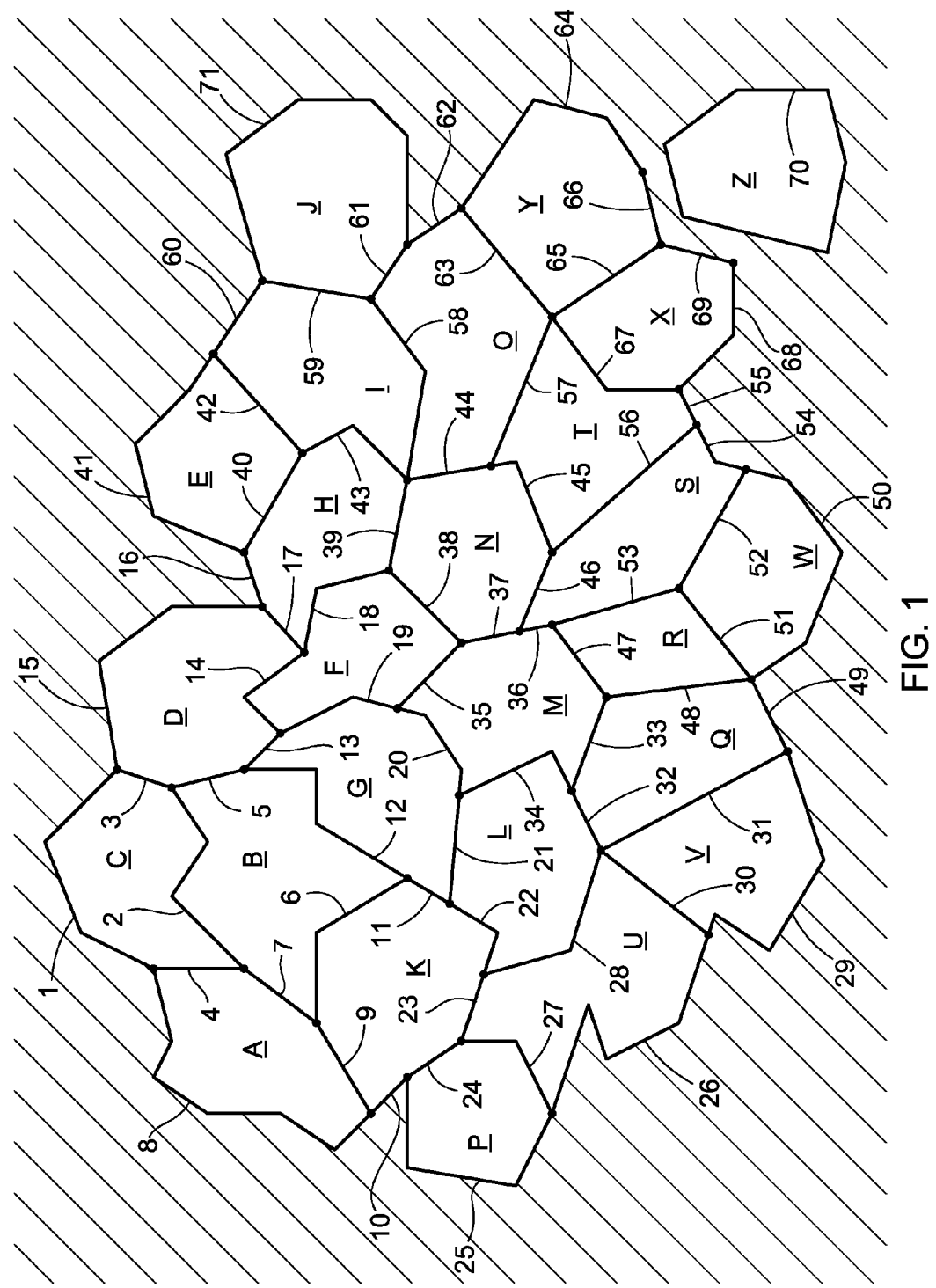
FIG. 1 illustrates schematically multiple polygonal boundaries and multiple piecewise-linear boundary segments.

FIG. 1 illustrates schematically a multitude of spatial areas A, B, C, etc. that are at least partly contiguous. "At least partly contiguous" is intended to mean that each one of a majority of the spatial areas shares at least a portion of its boundary with at least one other of the spatial areas. Each spatial area is bounded by a closed, polygonal boundary. The cross-hatching represents "outside" or "external" areas beyond the aggregate area of the multitude of the spatial areas A, B, C, etc. The spatial areas shown in FIG. 1 are all so-called "single polygons," i.e., each one is a single simply connected area. The systems and methods disclosed or claimed herein can be readily applied to so-called "multi-polygons" that can comprise one or more multiply connected areas, two or more unconnected areas, or both.

The spatial areas can be, e.g., geographic areas (the actual areas or representations on a globe or map). Many instances arise in which geographic areas are divided in this way, e.g., countries into states or provinces, states into counties, counties into voting precincts, or any larger areas into census blocks. Those and any other suitable examples shall fall within the scope of the present disclosure or appended claims.

The polygonal boundaries can accurately divide the spatial areas or can approximate a more complicated boundary shape.

FIG. 2A illustrates an example of a data table in which are stored, for each one of a multitude of at least partly contiguous spatial areas, a corresponding set of spatial coordinates of a closed, polygonal boundary of that spatial area. In the illustrated example, absolute rectilinear coordinates of each polygon vertex are employed, e.g., $(XA_1, YA_1)$, $(XA_2, YA_2)$, and so on for area A, and similarly for areas B, C, D, etc. Instead, the absolute coordinates of one vertex can be stored along with offset coordinates for the other vertices. Those offset coordinates can be rectilinear, polar, or otherwise, and can be defined with respect to the first vertex or the immediately preceding vertex along the perimeter of the area. Storing the vertex coordinates for each vertex of the polygonal boundary is a common and intuitive form in which to store a dataset defining the multitude of spatial areas. The coordinates can be stored in any needed or desired form, e.g., as integers, floating-point real numbers, binary indicia, etc., on any suitable computer-readable storage medium, e.g., RAM, ROM, magnetic or optical disc, flash memory, and so forth (see below).

FIG. 2B illustrates an example of an alternative data table for storing a dataset representative of the multitude of at least partly contiguous spatial areas. Instead of storing the spatial coordinates of each polygonal boundary, the dataset includes spatial coordinates of a multitude of piecewise-linear boundary segments 1, 2, 3, etc. (as in FIG. 1). Such piecewise-linear segments can also be referred to as polygonal chains, polygonal curves, polygonal paths, or piecewise-linear curves. In addition to points joining two segments, the end points are also considered vertices. Single line segments are also considered to be piecewise-linear segments.

In the illustrated example, absolute rectilinear coordinates of each boundary segment vertex are employed, e.g., $(X1_1, Y1_1)$, $(X2_2, Y2_2)$, and so on for boundary segment 1, and similarly for boundary segments 2, 3, 4, etc. Alternatively, the absolute coordinates of one vertex can be stored along with offset coordinates for the other vertices. Those offset coordinates can be rectilinear, polar, or otherwise, and can be defined with respect to the first vertex or the immediately preceding vertex along the length of the segment. The coordinates can be stored in any needed or desired form, e.g., as integers, floating-point real numbers, binary indicia, etc., on any suitable computer-readable storage medium, e.g., RAM, ROM, magnetic or optical disc, flash memory, and so forth. In some instances it may be convenient or necessary to assign a directionality value to each boundary segment; if such a value is assigned, it can be stored in the table of FIG. 3B (see below).

For both the polygonal boundary vertices stored as in FIG. 2A and the boundary segment vertices stored as in FIG. 2B, each of those objects can have varying numbers of vertices (usually a minimum of three vertices for a polygonal boundary and two vertices for a boundary segment). The schematic illustrations of FIGS. 2A and 2B are intended to convey that each polygonal boundary or boundary segment can include as many vertex coordinates as needed to adequately approximate the spatial regions of interest. The number of vertices can vary widely among different polygonal boundaries or different boundary segments. For example, accurate modeling of census blocks or voting precincts often requires polygonal boundaries or boundary segments having dozens, hundreds, or even thousands of vertices; the number can vary substantially from block to block or precinct to precinct.

The polygonal boundary of each spatial area A, B, C, etc. comprises one or more corresponding boundary segments, and each boundary segment 1, 2, 3, etc. forms a portion of the closed, polygonal boundary of at most two adjacent spatial areas and separates those spatial areas. In some instances, a boundary segment only forms part of the polygonal boundary of one of the areas, i.e., those areas that are on the "edge" of the aggregate area and are adjacent the "outside" or "external" area. The boundary segment dataset can further comprise one or both of (i) an indicator, for each spatial boundary segment, of the at most two corresponding adjacent spatial areas that are separated by that boundary segment (as in the data table illustrated in FIG. 3A, which includes specific examples from FIG. 1) or (ii) an indicator, for each spatial area, of one or more boundary segments that together form the entire polygonal boundary of that spatial area (as in the data table illustrated in FIG. 3B, which includes specific examples from FIG. 1). Note that the table of FIG. 3A includes empty or "null" entries for those boundary segments that divide one of the spatial areas from the external area; a null entry can also be employed in other cases wherein a boundary segment of one polygonal boundary does not correspond to a boundary segment of another polygonal boundary, e.g., if adjacent spatial areas overlap. The tables of FIGS. 3A and 3B can be employed to enable certain uses of the dataset of FIG. 2B, as described further below.

Any data table disclosed herein can be stored or organized in any suitable or desirable way, e.g., as a real, integer, binary, or alphanumeric array, a spreadsheet, a database table, or a binary or alphanumeric string. Any data table disclosed herein can be stored on any suitable computer-readable storage medium, including but not limited to those explicitly disclosed herein.

The dataset of FIG. 2B can be advantageously employed in a variety of ways. First, depending on the overall complexity of the polygonal boundaries, converting a dataset stored according to FIG. 2A into one stored according to FIG. 2B can result in significant size reduction of the dataset, with all the concomitant advantages (e.g., faster processing using computer systems with less memory or storage on smaller media). In either FIG. 2A or FIG. 2B, a series of spatial coordinates of multiple points are stored. In FIG. 2A, the coordinates of each vertex of each polygonal boundary are stored. The contiguous arrangement of a majority of the spatial areas ensures that many, and perhaps most, of the points will be stored at least twice (once each for adjacent polygons that share a vertex along their mutual boundaries). By storing vertices of boundary segments instead (as in FIG. 2B), in some instances there will be significant reduction in that redundant storage of spatial coordinates.

Figure 4A:
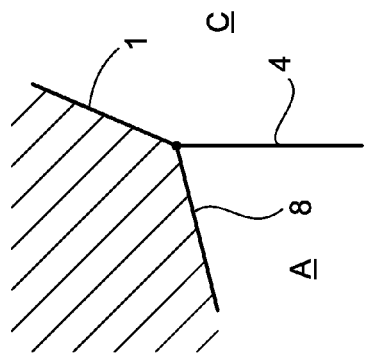
FIGS. 4A-4D illustrate schematically different types of vertices that occur among the multiple polygonal boundaries and boundary segments.

As illustrated schematically in FIGS. 4A-4D, each vertex among the areas A, B, C, etc. falls into one of four classes (or five classes, if any of the spatial areas are non-contiguous; see below). In FIG. 4A, a given vertex (on boundary segment 8 of area A) is on a single boundary segment that separates only one spatial area from the external area (indicated by crosshatching). The spatial coordinates of that vertex are stored only once in either storage scheme (FIG. 2A or FIG. 2B). In FIG. 4B, an "internal" vertex (i.e., not in contact with the external area) that joins three or more boundary segments is shown (boundary segments 35, 37, and 38). In the storage scheme of FIG. 2A, the vertex of FIG. 4B is stored once for each spatial area (F, M, and N) that meets at that vertex. In the storage scheme of FIG. 2B, the coordinates of the vertex of FIG. 4B are stored once for each boundary segment that meets at that point. For the vertex on FIG. 4B, those numbers are the same (e.g., three polygons separated by three boundary segments, four polygons separated by four boundary segments, and so on).

Figure 4C:
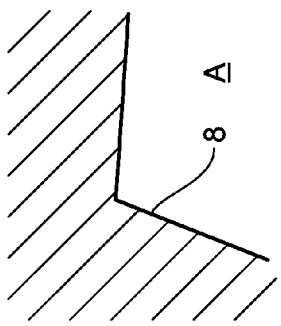
Figure 4B:
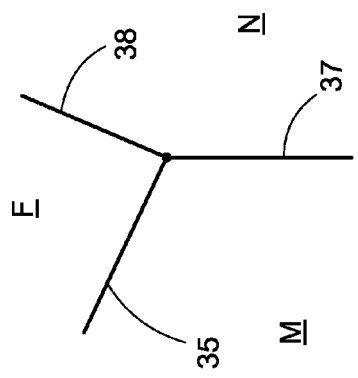
Figure 4D:
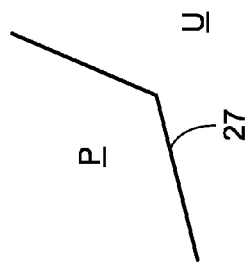

Differences arise, however, for the vertices shown in FIGS. 4C and 4D. In FIG. 4C, the vertex in question lies along a border where two or more polygonal areas (A and C in the example) meet along the boundary with the external area. Three boundary segments (1, 4, and 8) meet at that vertex. Along such external boundaries, the number of boundary segments exceeds the number of adjacent polygonal areas by one. Storage according to FIG. 2B requires one additional set of vertex coordinates to be stored for each vertex like that of FIG. 4C, relative to storage according to FIG. 2A. In FIG. 4D, an internal vertex is shown on a boundary segment (27) that divides only two adjacent areas (P and U). In the storage scheme of FIG. 2A, spatial coordinates of the vertex of FIG. 4D must be stored twice, whereas according to the storage scheme of FIG. 2B, the coordinates of the vertex of FIG. 4D need only be stored once.

If any of the spatial areas are not contiguous with any of the others (e.g., area Z bounded by boundary segment 70 in FIG. 1), then a fifth category of vertex must be considered (not shown among the examples of FIGS. 4A-4D). For a non-contiguous spatial area having a polygonal boundary with N vertices, N+1 vertices typically need to be stored for the corresponding single boundary segment that makes up the entire boundary (i.e., the start and end points are the same point). As a result, storage according to FIG. 2B requires an extra vertex to be stored for each non-contiguous spatial area, relative to storage according to FIG. 2A.

Depending on the nature of the aggregate area and its division into a multitude of constituent spatial areas, one scheme or the other (FIG. 2A versus FIG. 2B) can result in a smaller dataset. In examples wherein the aggregate area is finely subdivided into numerous areas, and in which the boundary segments dividing each pair of adjacent areas (i.e., the "internal" boundary segments) include numerous vertices, then size reductions of the dataset approaching a factor of two can be realized. That type of scenario appears to arise often, e.g., in the context of dividing a large geographic area into a set of numerous smaller constituent areas (e.g., dividing the entire United States into census blocks, or dividing an entire state into voting precincts). In contrast, if the aggregate area is divided into relatively few spatial areas, or if many of the internal boundary segments are single line segments or contain only a few vertices, then the dataset of FIG. 2B can be larger than that of FIG. 2A. Which of the two storage schemes is advantageous often must be determined empirically.

Regardless of the size of the stored dataset, one advantage that can be realized using the dataset of FIG. 2A is reducing the time required to graphically render the polygonal boundaries using a display device (e.g., monitor, flatpanel, or projector) or a printing device. Regardless of the complexity of the boundary segments of FIG. 2B, each one need only be rendered once. If the dataset of FIG. 2A is employed, all but the external boundary segments must be rendered twice (once for each of the corresponding pair of adjacent polygonal areas). For real-time visualization of a large and complex set of spatial areas such as census blocks or voting precincts, for example, a reduction of the rendering time by nearly a factor of two can be quite significant. The systems and methods disclosed or claimed herein can be advantageously employed in conjunction with systems and methods for high-speed searching and filtering of large datasets disclosed in (i) U.S. provisional App. No. 61/424,063 filed Dec. 17, 2010 in the name of Roy W. Ward, (ii) U.S. provisional App. No. 61/431,423 filed Jan. 10, 2011 in the names of Roy. W. Ward and David S. Alavi, (iii) U.S. provisional App. No. 61/431,654 filed Jan. 11, 2011 in the names of Roy. W. Ward and David S. Alavi, (iv) U.S. non-provisional application Ser. No. 13/326, 326 filed Dec. 15, 2011 in the name of Roy W. Ward, (v) U.S. provisional App. No. 61/583,130 filed Jan. 4, 2012 in the name of Roy W. Ward, and (vi) U.S. non-provisional application Ser. No. 13/347,646 filed Jan. 10, 2012 in the names of Roy. W. Ward and David S. Alavi. Each of said applications is entitled "Systems and methods for high-speed searching and filtering of large datasets" and is incorporated by reference as if fully set forth herein.

If only certain polygonal boundaries are to be rendered, or if the rendered polygonal boundaries are to be filled, it may be desirable to reconstruct the dataset of FIG. 2A from the dataset of FIG. 2B (instead of storing the dataset of FIG. 2A, which is potentially larger). The table of FIG. 3B is employed to direct which of the boundary segments are assembled to form each polygonal boundary. Proper assembly requires assembling the boundary segments in the correct order (determined by the order of their appearance in the corresponding record of the table of FIG. 3B) and also applying the correct directionality to each boundary segment. That directionality can be achieved computationally by matching one end point of a boundary segment to an end point of the next one, or it can be stored for each boundary segment as a part of the data records of FIG. 3B.

Another use for the dataset of FIG. 2B is for identifying in which of the multitude of spatial areas is located a given spatial point. For example, a set of voter registration data might include geographical coordinates for each address. It may be advantageous, for example, to identify in which precinct or census block is each address located. A dataset representing those spatial areas (e.g., voting precincts) according to the arrangement of FIG. 2B can be employed to process the geographical coordinates in the voter registration dataset to determine for each voter record the corresponding voting precinct. The information thus determined can be used and discarded or added to the voter dataset, as needed or desired. If added to the dataset, that addition can be achieved in any suitable way, including but not limited to an addition of data according to the disclosure of U.S. provisional App. No. 61/583,130 (incorporated above).

To make the determination, a query is made that includes spatial coordinates of the given spatial point. Using a suitably programmed computer system, boundary segments are identified that intersect a reference line segment extending from the given spatial point to an arbitrary end point outside the aggregate area encompassed by the multitude of spatial areas. A running tabulation is made, for each boundary segment thus identified, of the at most two adjacent spatial areas separated by that boundary segment (looked up in the table of FIG. 3A). The intersections between the reference line segment and one or more of the boundary segments can be identified in any suitable way. Speed gains can be realized (relative to use of a dataset arranged according to FIG. 2A) because, again, each boundary segment need be tested only once, whereas the dataset of FIG. 2A would typically cause many boundary segments to be interrogated twice as each of an adjacent pair of polygonal boundaries is tested. Once the tabulation is complete (or as it is performed), it is interrogated to identify a spatial area of the multitude that is tabulated an odd number of times; that spatial area contains the point of interest and is identified as such by the computer system. If no spatial area is tabulated an odd number of times, then the given point lies outside the aggregate area of the multitude of spatial areas and the computer system indicates that. Electronic indicia can be stored, or visual indicia displayed, indicating the spatial area identified as containing the given spatial point of interest. In the event that some of the spatial areas overlap, two or more of the areas might be tabulated an odd number of times and reported as containing the given spatial point.

The determination of the number of times a given spatial area is tabulated can be achieved in any suitable way. A simple enumeration of appearances in the tabulation can be done for each spatial area, and the one found to have appeared an odd number of times (if any) is identified as containing the given spatial point.

Alternatively, a bitwise exclusive-or (XOR) operation (provided on many computer processors) can be employed to speed up the tabulation. Beginning with an accumulator containing the value zero, a bitwise XOR operation is performed, on the accumulator and the one or two values for the adjacent spatial areas (read from the table of FIG. 3A), each time a boundary segment is crossed by the reference line, and the result is stored in the accumulator. After this has been done with all the crossed boundary segments, all the values accumulated an even number of times will have been canceled out, leaving only the operation applied to all values that occur an odd number of times. If the polygons are non-overlapping, there will be at most one odd value and the result will be the value corresponding to the polygonal boundary containing the given point. More generally, instead of exclusive-or, any abelian group operation wherein all elements of the group are self-inverses can be employed. If some of the spatial areas overlap, this technique yields the wrong result if the given point is in an overlap area. That problem can be mitigated by creating a new spatial area from the areas of overlap, i.e., modifying the multitude of spatial areas so that it includes only non-overlapping areas.

A suitable conversion process (e.g., for converting a dataset arranged according to FIG. 2A into a dataset arranged according to FIG. 2B), graphical rendering process, or area identification process typically is embodied as a computer program operating on one or more computers, computer systems, or servers, which include one or more processors and include or are otherwise operatively coupled to one or more computer-readable media of any suitable type. The computers, systems, or servers that perform any one of those processes need not be, and often are not, the same as those that perform the other processes. In all cases the computer, server, or system can be a stand-alone machine or can comprise one or machines connected by a local- or wide-area network (LAN or WAN) or the Internet. Any suitable hardware or hardware-plus-software implementation can be employed.

The systems and methods disclosed herein can be implemented as or with general or special purpose computers or servers or other programmable hardware devices programmed through software, or as hardware or equipment "programmed" through hard wiring, or a combination of the two. A "computer" or "server" can comprise a single machine or can comprise multiple interacting machines (located at a single location or at multiple remote locations). Computer programs or other software code, if used, can be implemented in temporary or permanent storage or in replaceable media, such as by including programming in microcode, machine code, network-based or web-based or distributed software modules that operate together, RAM, ROM, CD-ROM, CD-R, CD-R/W, DVD-ROM, DVD±R, DVD±R/W, hard drives, thumb drives, flash memory, optical media, magnetic media, semiconductor media, or any future storage alternatives.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

In addition to the preceding, the following examples fall within the scope of the present disclosure or appended claims:

Example 1

A computer-implemented method comprising: (a) reading or receiving from a computer-readable storage medium electronic indicia of a first dataset, said first dataset comprising, for each one of a multitude of at least partly contiguous spatial areas, a corresponding set of spatial coordinates of a closed, polygonal boundary of that spatial area; (b) using one or more computer processors programmed therefor and operatively coupled to the storage medium, generating electronic indicia of a second dataset, said second dataset comprising, for each one of a multitude of piecewise-linear spatial boundary segments, a corresponding set of spatial coordinates of that spatial boundary segment; and (c) storing the electronic indicia of the second dataset on a computer-readable storage medium operatively coupled to the processor, wherein: (d) the polygonal boundary of each spatial area comprises one or more corresponding boundary segments; (e) each boundary segment forms a portion of the closed, polygonal boundary of at most two adjacent spatial areas and separates those spatial areas.

Example 2

The method of Example 1 wherein the second dataset further comprises one or both of (i) an indicator, for each spatial boundary segment, of the at most two corresponding adjacent spatial areas that are separated by that boundary segment or (ii) an indicator, for each spatial area, of one or more boundary segments that together form the entire polygonal boundary of that spatial area.

Example 3

The method of Example 2 wherein the second dataset comprises, for each spatial boundary segment, an indicator of the at most two corresponding adjacent spatial areas that are separated by that boundary segment.

Example 4

The method of Example 2 wherein the second dataset comprises, for each spatial area, an indicator of one or more boundary segments that together form the entire polygonal boundary of that spatial area.

Example 5

The method of Example 1 wherein the set of spatial coordinates of each polygonal boundary or each boundary segment comprises spatial coordinates for each vertex of that boundary or segment.

Example 6

The method of Example 1 wherein the set of spatial coordinates of each polygonal boundary or each boundary segment comprises spatial coordinates for a first vertex of that boundary or segment and offset coordinates for other vertices of that boundary or segment.

Example 7

The method of Example 6 wherein the offset coordinates of each vertex are relative to an immediately adjacent vertex of the corresponding boundary or segment.

Example 8

The method of Example 6 wherein the offset coordinates of each vertex are relative to the first vertex of the corresponding boundary or segment.

Example 9

The method of Example 6 wherein the offset coordinates comprise rectilinear offsets.

Example 10

The method of Example 6 wherein the offset coordinates comprise a distance and direction.

Example 11

The method of Example 1 wherein the areas are geographical areas and the spatial coordinates are geographical coordinates.

Example 12

A computer system structured and connected to perform the method of any one of Examples 1-11.

Example 13

An article comprising a tangible medium encoding computer-readable instructions that, when applied to a computer system, instruct the computer system to perform the method of any one of Examples 1-11.

Example 14

An article comprising a tangible computer-readable medium encoded to store the electronic indicia of the second dataset generated and stored by the method of any one of Examples 1-11.

Example 15

A computer-implemented method for determining in which of a multitude of at least partly contiguous spatial areas is located a given spatial point, the method comprising: (a) receiving an electronic query that includes spatial coordinates of the given spatial point; (b) reading or receiving from a computer-readable storage medium electronic indicia of a dataset, said dataset comprising, for each one of a multitude of piecewise-linear spatial boundary segments, a corresponding set of spatial coordinates of that spatial boundary segment, wherein (i) a closed, polygonal boundary of each spatial area comprises one or more of the boundary segments, (ii) each boundary segment forms a portion of the polygonal boundary of at most two adjacent spatial areas and separates those spatial areas, and (iii) the dataset further comprises an indicator, for each spatial boundary segment, of the at most two corresponding adjacent spatial areas that are separated by that boundary segment; (c) using one or more computer processors programmed therefor and operatively coupled to the storage medium, identifying boundary segments that intersect a line segment extending from the given spatial point to an arbitrary end point outside the aggregate area encompassed by the multitude of spatial areas; (d) using one or more computer processors programmed therefor, tabulating, for each boundary segment identified in part (c), the at most two adjacent spatial areas separated by that boundary segment; (e) identifying as the spatial area containing the given spatial point the spatial area tabulated in part (d) an odd number of times; and (f) storing electronic indicia or displaying visual indicia of the spatial area identified in part (e).

Example 16

The method of Example 15 wherein the areas are geographical areas and the spatial coordinates are geographical coordinates.

Example 17

A computer system structured and connected to perform the method of Example 15 or 16.

Example 18

An article comprising a tangible medium encoding computer-readable instructions that, when applied to a computer system, instruct the computer system to perform the method of Example 15 or 16.

Example 19

A computer-implemented method for graphically rendering polygonal borders of a multitude of at least partly contiguous spatial areas, the method comprising: (a) reading or receiving from a computer-readable storage medium electronic indicia of a first dataset, said first dataset comprising, for each one of a multitude of piecewise-linear spatial boundary segments, a corresponding set of spatial coordinates of that spatial boundary segment, wherein (i) a closed, polygonal boundary of each spatial area comprises one or more of the boundary segments and (ii) each boundary segment forms a portion of the polygonal boundary of at most two adjacent spatial areas and separates those spatial areas; and (b) using one or more computer processors programmed therefor and operatively coupled to the storage medium and to a display device, graphically rendering on the display device each of the boundary segments, thereby graphically rendering on the display device the multitude of spatial areas.

Example 20

The method of Example 19 wherein the areas are geographical areas and the spatial coordinates are geographical coordinates.

Example 21

The method of Example 20 further comprising overlaying the rendered boundary segments on a map, chart, or globe.

Example 22

A computer system structured and connected to perform the method of any one of Examples 19-21.

Example 23

An article comprising a tangible medium encoding computer-readable instructions that, when applied to a computer system, instruct the computer system to perform the method of any one of Examples 19-21.

In the foregoing Detailed Description, various features may be grouped together in several exemplary embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed exemplary embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., sets of features that are not incompatible or mutually exclusive) that appear in the present disclosure or the appended claims, including those sets that may not be explicitly disclosed herein. It should be further noted that the scope of the appended claims does not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof, wherever they appear, shall be construed as open ended terminology, with the same meaning as if the phrase "at least" were appended after each instance thereof.

In the appended claims, if the provisions of 35 USC §112 ¶6 are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112 ¶6 are not intended to be invoked for that claim.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A computer-implemented method comprising:
   (a) reading or receiving from a first computer-readable storage medium electronic indicia of a first dataset, said first dataset comprising, for each one of a multitude of at least partly contiguous spatial areas, a corresponding set of spatial coordinates of a closed, polygonal boundary of that spatial area;
   (b) using one or more computer processors programmed therefor and operatively coupled to the storage medium, generating electronic indicia of a second dataset, said second dataset comprising, for each one of a multitude of piecewise-linear spatial boundary segments, a corresponding set of spatial coordinates of that spatial boundary segment; and
   (c) storing the electronic indicia of the second dataset on a second computer-readable storage medium operatively coupled to the processor, wherein:
   (d) the polygonal boundary of each spatial area comprises one or more corresponding boundary segments;
   (e) each boundary segment forms a portion of the closed, polygonal boundary of at most two adjacent spatial areas and separates those spatial areas; and
   (f) space on the second storage medium occupied by the electronic indicia of the second dataset is less than space on the first storage medium occupied by the electronic indicia of the first dataset.

2. The method of claim 1 wherein the second dataset further comprises one or both of (i) an indicator, for each spatial boundary segment, of the at most two corresponding adjacent spatial areas that are separated by that boundary segment or (ii) an indicator, for each spatial area, of one or more boundary segments that together form the entire polygonal boundary of that spatial area.

3. The method of claim 2 wherein the second dataset comprises, for each spatial boundary segment, an indicator of the at most two corresponding adjacent spatial areas that are separated by that boundary segment.

4. The method of claim 2 wherein the second dataset comprises, for each spatial area, an indicator of one or more boundary segments that together form the entire polygonal boundary of that spatial area.

5. The method of claim 1 wherein the set of spatial coordinates of each polygonal boundary or each boundary segment comprises spatial coordinates for each vertex of that boundary or segment.

6. The method of claim 1 wherein the set of spatial coordinates of each polygonal boundary or each boundary segment comprises spatial coordinates for a first vertex of that boundary or segment and offset coordinates for other vertices of that boundary or segment.

7. The method of claim 6 wherein the offset coordinates of each vertex are relative to an immediately adjacent vertex of the corresponding boundary or segment.

8. The method of claim 6 wherein the offset coordinates of each vertex are relative to the first vertex of the corresponding boundary or segment.

9. The method of claim 6 wherein the offset coordinates comprise rectilinear offsets.

10. The method of claim 6 wherein the offset coordinates comprise a distance and direction.

11. The method of claim 1 wherein the areas are geographical areas and the spatial coordinates are geographical coordinates.

12. A computer system comprising one or more processors and one or more computer memories structured and connected to perform the method of claim 1.

13. An article comprising a tangible, non-transitory medium encoding computer-readable instructions that, when applied to a computer system, instruct the computer system to perform the method of claim 1.

14. An article comprising a tangible, non-transitory computer-readable medium encoded to store the electronic indicia of the second dataset generated and stored by the method of claim 1.

15. The method of claim 1 wherein space on the first storage medium occupied by the electronic indicia of the first dataset is about twice as large as space on the second storage medium occupied by the electronic indicia of the second dataset.

16. The method of claim 1 wherein the first and second storage media are the same storage medium.

17. A computer-implemented method for graphically rendering polygonal borders of a multitude of at least partly contiguous spatial areas, the method comprising:
(a) reading or receiving from a computer-readable storage medium electronic indicia of a first dataset, said first dataset comprising, for each one of a multitude of piecewise-linear spatial boundary segments, a corresponding set of spatial coordinates of that spatial boundary segment, wherein (i) a closed, polygonal boundary of each spatial area comprises one or more of the boundary segments and (ii) each boundary segment forms a portion of the polygonal boundary of at most two adjacent spatial areas and separates those spatial areas; and
(b) using one or more computer processors programmed therefor and operatively coupled to the storage medium and to a display device, and using the first dataset, graphically rendering on the display device each of the boundary segments, thereby graphically rendering on the display device the multitude of spatial areas,
(c) wherein the multitude of spatial areas is rendered on the display device in less time than would be required to render the multitude of spatial areas on the display device, using the one or more processors, using a second dataset comprising spatial coordinates of the closed, polygonal boundaries of the multitude of spatial areas.

18. The method of claim 17 wherein the areas are geographical areas and the spatial coordinates are geographical coordinates.

19. The method of claim 18 further comprising overlaying the rendered boundary segments on a map, chart, or globe.

20. A computer system comprising one or more processors and one or more computer memories structured and connected to perform the method of claim 17.

21. An article comprising a tangible, non-transitory medium encoding computer-readable instructions that, when applied to a computer system, instruct the computer system to perform the method of any one of claim 17.

22. The method of claim 17 wherein the multitude of spatial areas is rendered on the display device in about half the time that would be required to render the multitude of spatial areas on the display device, using the one or more processors, using a second dataset comprising spatial coordinates of the closed, polygonal boundaries of the multitude of spatial areas.

23. The method of claim 17 wherein each of the boundary segments is rendered only a single time in the course of rendering the multitude of spatial areas.

* * * * *